United States Patent

Araujo

[15] 3,649,311
[45] Mar. 14, 1972

[54] COLORLESS HEAT-ABSORBING GLASS

[72] Inventor: Roger J. Araujo, Corning, N.Y.

[73] Assignee: Corning Glass Works, Corning, N.Y.

[22] Filed: June 5, 1969

[21] Appl. No.: 830,653

[52] U.S. Cl. .................................................. 106/54, 252/300
[51] Int. Cl. ............................................................ C03c 3/04
[58] Field of Search ..................... 106/54, 52; 350/1; 65/32; 252/300

[56] References Cited

UNITED STATES PATENTS

| | | | |
|---|---|---|---|
| 2,714,558 | 8/1955 | Brown et al. | 106/54 |
| 3,010,836 | 11/1961 | Upton et al. | 106/54 |
| 3,326,703 | 6/1967 | Harrington | 106/54 |
| 2,035,318 | 3/1936 | Hood | 106/54 |
| 2,773,775 | 12/1956 | Levengood | 106/52 |
| 3,531,271 | 9/1970 | Dumbaugh | 65/32 |

*Primary Examiner*—James E. Poer
*Assistant Examiner*—W. R. Satterfield
*Attorney*—Clarence R. Patty, Jr. and Clinton S. Janes, Jr.

[57] ABSTRACT

This invention relates to the production of glasses in the alkali metal aluminoborosilicate composition field containing reduced iron and chloride which are colorless, transparent, and strongly absorbing of radiation wave lengths longer than 0.7 microns. More particularly, this invention relates to glasses consisting essentially, by weight on the oxide basis, of about 3–12% $R_2O$, 3–10% $Al_2O_3$, 18–30% $B_2O_3$, 45–65% $SiO_2$, 0.3–1% FeO, and 0.5–5% Cl, wherein $R_2O$ consists of 0–5% $Li_2O$, 2–12% $Na_2O$, and 0–10% $K_2O$.

2 Claims, 1 Drawing Figure

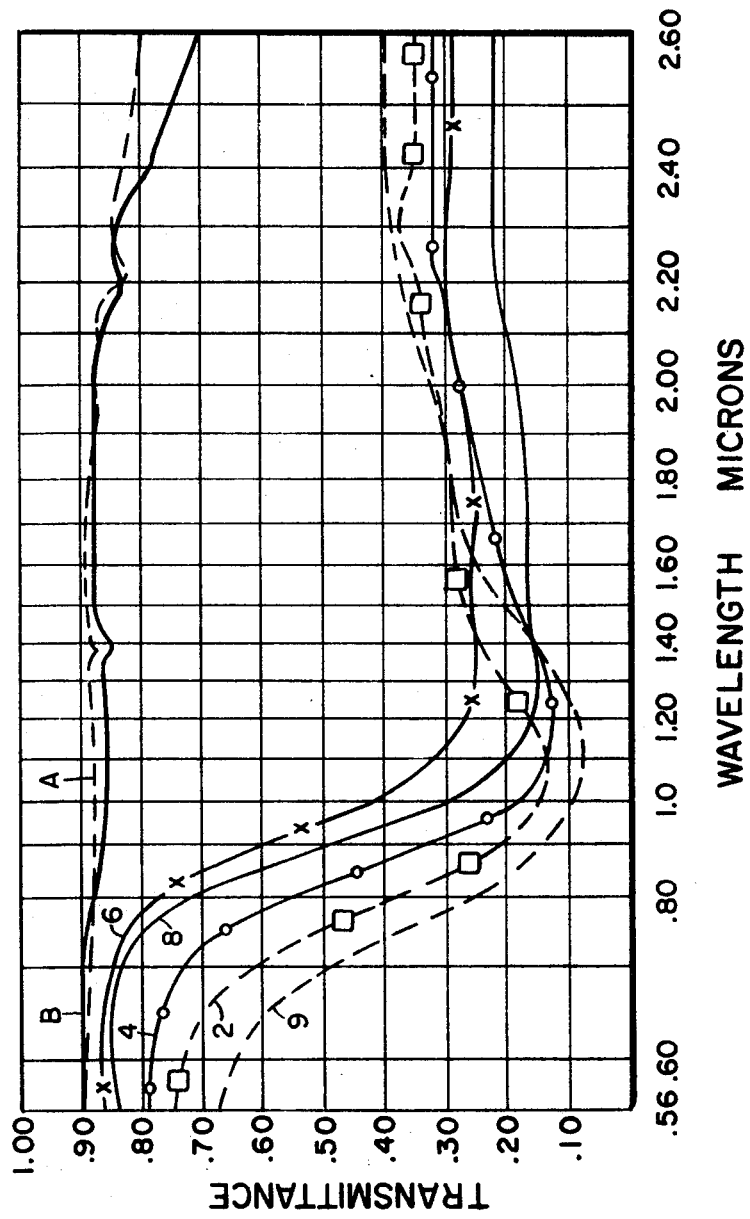

COLORLESS HEAT-ABSORBING GLASS

Heat-absorbing glasses, i.e., glasses which absorb radiations in the infrared portion of the spectrum, have been well known for many years. In the main, these glasses have inclined iron in the reduced state as the active infrared absorbing agent. Hence, for example, U.S. Pat. Nos. 1,737,685 and 1,921,752 disclose certain borosilicate glasses containing iron in the reduced state which exhibit high absorption of infrared radiation. These glasses, though reasonably transparent, were colored to a blue-to-green shade. This color recommended their use in various lighting applications since the illumination provided thereby exhibited a visible transmission approximating that characteristic of sunlight. More recently, U.S. Pat. Nos. 3,114,863 and 3,169,217 have disclosed other glass compositions containing reduced iron and other ingredients in such quantities that essentially all radiations between about 0.2 and 2.0 microns are absorbed. However, these glasses are completely opaque to visible radiation but have been employed in the fabrication of electronic components for glass-to-metal seals. Thus, whereas infrared radiation absorbing glasses have been available, the absorption thereof has not been substantial unless the glass assumed a coloration or became opaque.

Therefore, the principal object of this invention is to provide a chemically durable, essentially colorless and transparent glass which absorbs very strongly in the infrared portion of the spectrum.

Other objects will become apparent from an examination of the following description of the invention and the appended drawing which records curves indicating the infrared transmission as obtained through spectrophotometric measurements.

It is well known in the glass art, e.g., *Colored Glasses*, W. A. Weyl, Dawson's of Pall Mall, London, 1959, pp. 89–120, that the presence of reduced iron in glass gives rise to an absorption in the infrared spectrum. The common technique for melting these so-called reduced iron glasses is to introduce divalent iron into the batch (quite commonly as the oxalate) and include a reducing agent therein also. This reducing agent is frequently some kind of carbonaceous material such as graphite, starch, or sugar. Sometimes, however, powdered metals such as aluminum or iron are employed therefor. These reducing agents are added to the batch materials in order to force the $Fe^{3+} \rightleftharpoons Fe^{2+}$ equilibrium to drift towards the divalent iron state during the melting process.

Nevertheless, as has been pointed out above, the known iron-containing glasses did not demonstrate very high infrared absorption until the glass exhibited considerable color or became entirely opaque to visible radiations. These glasses would not be operable in such applications as automobile windshields and building windows where a colorless, transparent glass is desirable. Yet, an infrared absorbing glass would be a very useful product since a portion of the heat from sunlight passing therethrough would be absorbed, thereby reducing the amount of cooling required to bring an automobile interior or dwelling room to a comfortable temperature.

I have discovered that, through the careful control of a combination of $B_2O_3$, divalent iron, and chloride in certain sodium aluminoborosilicate compositions, colorless transparent glass articles can be produced which strongly absorb radiations having wave lengths longer than 0.7 microns. These glasses consist essentially, by weight on the oxide basis, of about 3–12% $R_2O$, 3–10% $Al_2O_3$, 18–30% $B_2O_3$, 45–65% $SiO_2$, 0.3–1% FeO, and 0.5–5% Cl, wherein $R_2O$ consists of 0–5% $Li_2O$, 2–12% $Na_2O$, and 0–10% $K_2O$.

The following table records several glass compositions, expressed in weight percent on the oxide basis, which are illustrative of my invention. Inasmuch as it is not known with which cations the halide ions are combined within the glass, they are reported separately as chloride and fluoride in accordance with conventional glass analytical procedure. The batch ingredients may comprise any materials, either the oxides or other compounds, which, upon being melted together will be converted to the desired oxide composition in the proper proportions. The halides will commonly be added as a salt. The $Sb_2O_3$ and $SnO_2$ (added as $SnCl_2$) acted as reducing agents. About 1 percent by weight of sugar was also included in the batch to function as a reducing agent but, since essentially none remains in the glass after the melting step, it was not made part of the table.

The batch constituents were compounded, ballmilled together to aid in securing a homogeneous melt, and then melted in open platinum crucibles for 6 hours at 1,550° C. Platinum stirrers were employed during the melting process to insure a homogeneous melt. Glass cane samples about one-quarter inch in diameter were hand drawn from each crucible and the remainder of the melt poured into steel molds about 6inch×6 inch×¼ inch. The molds containing the melt were transferred to an annealer operating at about 600° C. The glass shapes were removed from the molds and then ground and polished preparatory to being tested for infrared transmission.

TABLE

|  | 1 | 2 | 3 | 4 | 5 |
|---|---|---|---|---|---|
| $SiO_2$ | 61.1% | 56.7% | 50.9% | 55.6% | 53.8% |
| $Al_2O_3$ | 7.6 | 8.6 | 8.6 | 8.4 | 4.7 |
| $B_2O_3$ | 19.0 | 19.2 | 28.9 | 18.8 | 28.3 |
| $Na_2O$ | 3.7 | 9.6 | 5.7 | 9.3 | 5.7 |
| $Li_2O$ | 0.9 | - | - | - | - |
| F | 1.2 | 0.6 | 0.6 | - | 0.6 |
| FeO | 0.4 | 0.6 | 0.6 | 0.6 | 0.6 |
| $SnO_2$ | 2.8 | 1.4 | 1.4 | 1.4 | 2.8 |
| $Sb_2O_3$ | 0.9 | 0.9 | 0.9 | 0.9 | 0.4 |
| CdO | - | 1.8 | 1.8 | 1.8 | 1.8 |
| Cl | 2.6 | 0.6 | 0.6 | 3.2 | 1.3 |

|  | 6 | 7 | 8 | 9 |
|---|---|---|---|---|
| $SiO_2$ | 53.0% | 53.8% | 53.5% | 56.0% |
| $Al_2O_3$ | 4.6 | 4.6 | 4.6 | 8.5 |
| $B_2O_3$ | 27.8 | 28.1 | 28.0 | 14.1 |
| $Na_2O$ | 5.5 | 5.6 | 5.6 | 11.3 |
| $Li_2O$ | - | - | - | - |
| F | 0.6 | 0.6 | 0.6 | 0.6 |
| FeO | 0.6 | 0.6 | 0.9 | 0.6 |
| $SnO_2$ | 2.7 | 1.4 | 2.8 | 1.4 |
| $Sb_2O_3$ | 0.4 | 0.9 | 0.4 | 0.9 |
| CdO | 1.7 | 1.8 | 1.8 | 4.7 |
| Cl | 3.1 | 2.6 | 1.8 | 1.9 |

The glasses of this invention exhibit coefficients of thermal expansion (0°–300° C.) of between about 45–60×10$^{-7}$/°C., making them especially suitable for sealing with molybdenum, tungsten, and KOVAR™ alloy comprising 28% Ni, 18% Co, 54% Fe. The chemical durability thereof is also very satisfactory, showing no reaction in the standard glass durability test, viz, contact with 10 percent by weight HCl for 10 minutes at 25° C.

The transmission of infrared radiations through the glasses of the instant invention in samples having a cross section of 4 mm. is illustrated by the spectrophotometric curves comprising the appended drawing. These curves were obtained utilizing a Perkin-Elmer Model 350 Spectrophotometer. The numbers assigned to the curves reflect the examples recited in the table. The marked improvement in the absorption of infrared radiations exhibited by the glasses of this invention is readily apparent from a comparison of these curves with Curves A and B which depict the transmission of infrared radiations through a commercial soda-lime-silica glass (Corning Code 0080) and a commercial borosilicate glass (Corning Code 7740), respectively.

This improvement in infrared absorption is not only advantageous in windows for automobiles and buildings but also provides the practical benefit of enabling a sealing operation to be conducted more rapidly. This speed of sealing means that the components being sealed need not be subjected to high temperatures for extended periods of time. Hence, for example, a solid state device which is being encapsulated is not exposed to as much heat during the sealing operation. Also, being colorless and transparent, encapsulation therewith is rendered easier. Finally, another desirable feature of these glasses, viz, their chemical durability to acids, is especially important in sealing applications inasmuch as it is frequently necessary to form a metal plating thereon, e.g., gold or silver which is deposited from an alkali cyanide bath. Later, the plated article may be immersed in an acid pickling bath to clean off the metal.

A review of the Table in combination with the transmission curves points up several features of the invention. The intensity of the infrared absorption is related to the concentration of the iron when the glass batch is melted under sufficiently reducing conditions. Such reducing conditions can be secured through the addition of carbonaceous material such as sugar to the batch although better control thereof can be achieved through the inclusion of stannous tin. However, where tin is added in amounts greater than about 5% SnO, there is an increase in absorption in the blue end of the spectrum.

A comparison of the spectrophotometric curves on the appended drawing dramatically illustrates the infrared absorbing ability of the present glasses. This ability becomes pronounced at 0.7 microns with the maximum absorption being at about 1.1–1.2 microns. Thus, whereas the instant glasses are not as absorbing of heat radiations as the colored and opaque glasses of the prior art cited above, the curves clearly demonstrate that these glasses will absorb 70–80 percent of the long wave radiations while retaining essentially colorless transparency.

The compositions ranges delineated above are critical to the invention with the sum of the $R_2O$, $Al_2O_3$, $B_2O_3$, $SiO_2$, FeO, and Cl constituting at least 90 percent by weight of the glass. Hence, minor amounts of compatible metal oxides such as CaO, MgO, BaO, PbO, CdO, ZnO, $ZrO_2$, $Rb_2O$, $Cs_2O$, and $P_2O_5$ may be present either as a melting aid or to vary the physical properties of the final product. Thus, for example, BaO and PbO can be used to alter the refractive index of the glass and $ZrO_2$ is well known for its faculty of improving the chemical durability of a glass. Nevertheless, it is preferred that no individual addition be made of more than about 5 percent by weight. Also, fluoride in amounts less than about 3 percent by weight is often advantageously added to the glass as a melting aid.

The interaction of $B_2O_3$ and Cl is especially critical to the invention. At $B_2O_3$ levels greater than about 30 percent by weight and less than about 18 percent by weight, the glass assumes a visible color no matter what value of chloride is employed. The preferred ranges of each component are about 25–30% $B_2O_3$ and 2–3.5% Cl. At least 0.3% FeO must be present to impart the desired infra-red absorbing quality to the glass but the presence of more than about 1% FeO develops visible coloration in the glass. About 0.5–0.7 percent by weight appears to yield the most satisfactory product.

Example 6 is the preferred embodiment of the invention due to its melting and forming characteristics as well as its colorlessness with good absorbence of infrared radiations.

I claim:

1. An essentially colorless, transparent glass exhibiting a coefficient of thermal expansion between 0°–300° C. of about $45–60\times10^{-7}/°$ C. and having, in a thickness of 4 mm., an absorption of at least about 70 percent of the radiation at wavelengths of about 1.1–1.2 microns, this glass consisting essentially, by weight on the oxide basis, of about 3–10% $Al_2O_3$, 18–30% $B_2O_3$, 0.3–1% FeO, 0.5–5% $Cl_2$, 45–65% $SiO_2$, and 3–12% $R_2O$, wherein $R_2O$ consists of 0–5% $Li_2O$, 2–12% $Na_2O$, and 0–10% $K_2O$.

2. A glass according to claim 1 wherein the $B_2O_3$ content is 25–30 percent by weight, the Cl content is 2–3.5 percent by weight, and the FeO content is 0.5–7 percent by weight.

* * * * *